(Model.)
L. E. WHEELER.
CUTTING APPLIANCE FOR LATHES.
No. 330,948. Patented Nov. 24, 1885.
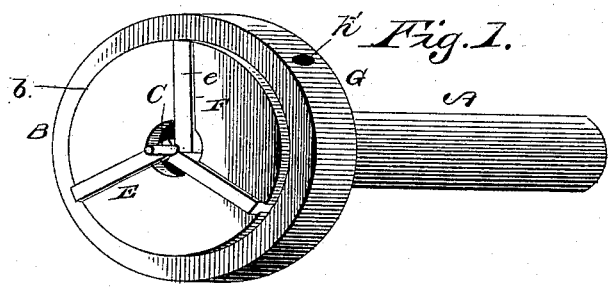
Fig. 1.
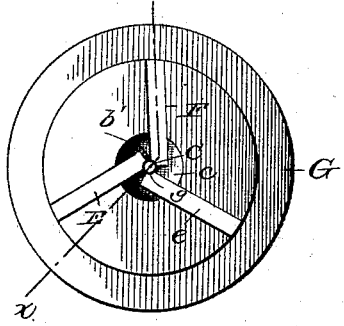
Fig. 2.
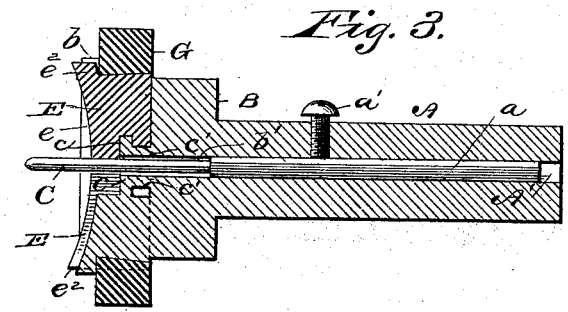
Fig. 3.
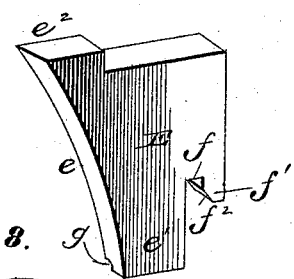
Fig. 4.
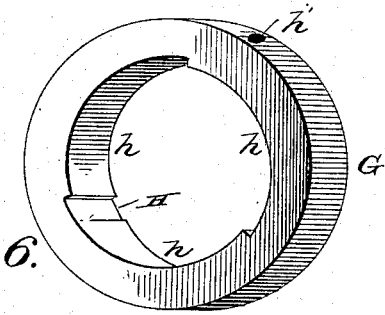
Fig. 5.
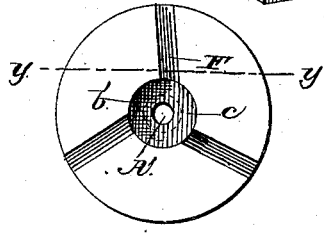
Fig. 8.
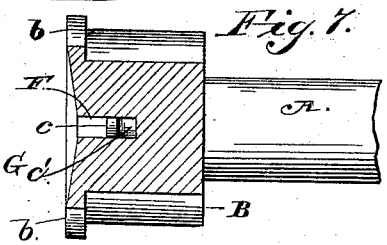
Fig. 6.
Fig. 7.
WITNESSES
INVENTOR
L. E. Wheeler
By C. A. Snow & Co.
Attorneys
N. PETERS, Photo-Lithographer, Washington, D. C.

UNITED STATES PATENT OFFICE.

LEWIS EVERITT WHEELER, OF EAST HAMPTON, MASSACHUSETTS.

CUTTING APPLIANCE FOR LATHES.

SPECIFICATION forming part of Letters Patent No. 330,948, dated November 24, 1885.

Application filed September 4, 1885. Serial No. 176,196. (Model.)

*To all whom it may concern:*

Be it known that I, LEWIS E. WHEELER, a citizen of the United States, residing at East Hampton, in the county of Middlesex and State of Connecticut, have invented a new and useful Improvement in Cutting Appliances for Lathes, of which the following is a specification, reference being had to the accompanying drawings.

My invention has relation to cutting appliances for lathes and the like; and the invention consists in the peculiar construction and combination and arrangement of the various parts for service, substantially as hereinafter fully set forth, and particularly pointed out in the claims.

Among other things my invention has for its object to provide a cutting appliance for a lathe which shall be capable of rounding the ends or heads of bolts, studs, and the like, which shall be capable of adjustment so as to cut the ends off squarely or nearly so, which shall center the bolt, stud, &c., and which shall combine simplicity, strength, and durability of construction with thorough effectiveness of operation and adjustability of parts to accommodate bolts or studs of different diameters.

I have shown an embodiment of my invention in the accompanying drawings, in which Figure 1 is a perspective view of a chuck having my improvements. Fig. 2 is an elevation thereof. Fig. 3 is a longitudinal sectional view on the line $x\ x$ of Fig. 2. Fig. 4 is a detail view of one of the cutting-dies. Figs. 5 and 6 are detail views of the die-clamping eccentric ring. Fig. 7 is a longitudinal sectional view through the head-stock on a line, $y\ y$, of Fig. 8, the cutting-dies and clamping-ring being removed from the device. Fig. 8 is a face view of the head-stock.

Like letters of reference indicate corresponding parts in all the figures of the drawings, referring to which—

A designates the stock, of any preferred size, which is removably secured in a lathe of any class and adapted to be thereby revolved. At the outer end of the stock A is a head, B, formed or cast integral therewith, and made cylindrical and of a considerable larger diameter than the stock A, said head being provided at its extreme outer end with an upwardly-projecting, narrow circumferential flange, $b$. (See Fig. 7.) A is provided with a longitudinal central passage, A', in which is fitted a sliding rod or piece, $a$, adapted to be held in position against movement by a bolt or screw, $a'$, working in a threaded opening arranged at right angles to the plane of the longitudinal passage, said sliding piece $a$ adapted to adjust or vary the distance that the center pin, C, projects beyond the cutting-dies E. The outer vertical face of the head B is hollowed out or made slightly concave, as shown in Figs. 3 and 7, and at the middle thereof is a circular cutaway portion or passage, $b'$, with which communicate three radial grooves, F, adapted to form sockets or seats for the cutting-dies E, which correspond in number to the grooves or seats of the head-stock. The central bore, A', communicates at its outer end with the bore $b'$ of the head-stock, which is of larger diameter than the bore A'.

$c$ designates a short vertical partition arranged in the central longitudinal passage, $b'$, of the head-stock, said partition $c$ projecting into the radial grooves or seats F, and arranged between the outer concave face of the head-stock B and the inner walls of the radial grooves or seats F at a short distance from the latter, to provide an intermediate space, $c'$, in which fits a projection of one of the cutting-dies, as will more fully presently appear.

Each of the cutting-dies E has a longitudinal curved face with sharp cutting-edges $e$, a shank, $e'$, at its lower inner end, and a projection, $e^2$, at its upper edge. (See Fig. 4). The outer cutting-edge of each die E is curved and tapered in the direction of its greater diameter—that is to say, when the die lies in a vertical position the outer face thereof is tapered inwardly from the top toward the bottom or lower edge thereof, and leaves the outer cutting-edge $e$ projecting beyond the concave face of the head-stock, the projection $e^2$ at the upper end projecting a greater distance from the head-stock than the lower edge, thus presenting a gradually inwardly-inclined face, which is adapted to cut or form the rounded end to the bolt or stud under the action of the device.

The radial grooves or seats F in the headstock extend from the longitudinal central bore, $b'$, thereof to the periphery, and are arranged out the line of center or gravity thereof, (see Figs. 2 and 8,)—that is to say, the grooves are gradually inclined from the periphery of the head-stock to one side of the line of gravity or center drawn through the central passage and a given point in the periphery. The result secured by this arrangement is that when the dies are seated properly in the grooves or seats F one edge of the outer cutting-edge of such dies is depressed or thrown below the plane of the other cutting-edge of such die, the lower or depressed cutting-edge being arranged first in the plane of rotation of the head-stock, and the rear edge being elevated or inclined slightly above the first cutting-edge, and serves to further act on or finish the head of the bolt under the action of the cutting appliance.

The shank $e'$ of each cutting-die has a cut-away portion at its lower rear end, and a recess, $f$, communicating therewith so as to leave a projecting tongue, $f'$, the inner edge of which is beveled or tapered, as at $f^2$, to permit the die E to be adjusted back and forth in its seat, as will be presently described. The lower outer edge of the shank and face of the die projects beneath the ring or flange $c$, while the recessed portion and the projection $f'f^2$ fits on said flange and in the recess $c'$, between the same and inner wall of the die-seats E, respectively, as clearly shown in Fig. 3 of the drawings.

One edge of each of the lower ends of the dies at the common center at which all of said dies meet is cut away or grooved, as at $g$, to provide a bearing for the center pin, C, which is thus held or clamped in position. The cutting-edges of each of the dies is arranged below the plane of the rear edges of the adjacent cutter or die, the position of these parts being incident upon providing the cutting-faces of the dies with longitudinally tapered and curved faces, and seating them in inclined seats or grooves in the head-stock, as described.

The upper edges of the die-shanks project beyond the side walls of their seats in the head B, and are engaged and clamped in position by means of a ring, G, having a number of eccentrically-arranged portions or cams, $h$, arranged or cut on its inner surface, the number of eccentrics corresponding to the number of cutting-dies.

H designates recesses or cut-away portions arranged transversely across the inner face of the clamping-ring, one edge of each eccentric portion $h$ being cut down flush with the inner wall of each of said recesses to allow the ring to ride over the inner projecting end of the shank in adjusting the devices. The upper projecting portions of the shanks of the cutting-dies fit in the recesses H of the ring G, which is then turned in one direction until the projecting cam-faces $h$ bind tightly upon the enlarged head B, the front vertical wall of which abuts against the inner surface of the flange $b$ when the several parts are in position.

The outer surface of the ring G is provided with a recess or socket, $h'$, in which fits the projecting nib of a crank, said crank being adapted to turn the ring G, to clamp or loosen the same.

It will be observed from the foregoing description, taken in connection with the drawings, that the radially-arranged cutting-dies can be adjusted slightly inwardly and outwardly, to cut or trim the ends of a bolt, stud, &c., by simply forcing or moving the lower inner ends of said dies in or out as occasion may require, the ring G being first detached and removed from engagement therewith. The upper edges of the dies are thus extended or contracted beyond or within the face of the head, according to the position of the lower end thereof, the recessed cut-away portion of the shank serving as the bearing therefor.

The operation of my invention will be readily understood from the foregoing. Various changes in the form and proportions of parts and details of construction may be made without departing from the spirit or sacrificing the advantages of my invention, the essential feature of which is a series of radially-adjustable cutting-dies having a clamping-ring, and adapted to cut or trim the heads of bolts, studs, &c., to the required shape.

The device is especially adapted for light work in a lathe in the form shown in the accompanying drawings, but it can be adapted to do work of the character described on large shafts by changing the relative proportions of parts. The cutting-dies can also be used as hollow mills, and be tapped out to adapt them to be used as threading-dies.

The ring G can be turned by any means, and when it is desired to tighten the same it is placed in a vise to hold it against movement.

Having thus fully described my invention, what I claim as new, and desire to secure by Letters Patent, is—

1. The combination, with a head, of a series of radially-adjustable dies and a clamping-ring, substantially as shown and described.

2. The combination, with a recessed head, of a series of radially-adjustable cutting-dies and an eccentric clamping-ring, substantially as shown and described.

3. The combination, with a recessed head-stock, of a series of radially-arranged cutting-dies seated in said recesses and adjustably held in position therein, substantially as described.

4. The combination, with a recessed head-stock having a concave face, of radially-arranged cutting-dies seated in said recesses and adapted to clamp a center-pin, and an eccentric clamping-ring adapted to engage and clamp said dies in position, substantially as described.

5. The combination of a recessed head having a concave face and a circumferential flange, of a series of cutting-dies arranged in said recesses and having shanks projecting beyond the walls thereof, and an eccentric ring adapted to grasp said die-shanks and abut against the flange of the head-stock, substantially as described.

6. The combination, with a head and a clamping-ring, of a series of radially-arranged cutting-dies having their cutting-edges arranged out of the plane of rotation of the adjacent edges of their fellow dies, substantially as described.

7. The combination, with a grooved head-stock having seats $c\ c'$ therein, of notched cutting-dies seated therein, and an eccentric clamping-ring, substantially as described.

8. The combination of a recessed head-stock having seats $c\ c'$ therein, and a concave face, a series of radially-arranged cutting-dies having their lower ends slotted, as at $f^2$, and bearing in the seats $c\ c'$ a drill-center, C, clamped by said dies, and a recessed eccentric clamping-ring, G, substantially as described.

9. In a cutting appliance for lathes, the combination of a head-stock having radial grooves or seats in its outer face, arranged out the line of gravity between the periphery and center thereof, and a series of radially-arranged cutting-dies rigidly held in position in said head-stock, as set forth.

10. In a cutting appliance for lathes, the combination of a head-stock having central passages, and a series of radial grooves or seats arranged out of the line of center between the periphery and center of said head-stock, a series of cutting-dies seated in said grooves or seats and rigidly held in position, and a center pin arranged in the central passage of the head-stock and clamped in position by the cutting-dies, as set forth.

In testimony that I claim the foregoing as my own I have hereto affixed my signature in presence of two witnesses.

LEWIS EVERITT WHEELER.

Witnesses:
CHARLES D. MILLER,
HENRY A. HERRICK.